(12) United States Patent
Stultz

(10) Patent No.: US 12,025,268 B2
(45) Date of Patent: Jul. 2, 2024

(54) GREASE TRAP SYSTEM

(71) Applicant: David Stultz, Odessa, TX (US)

(72) Inventor: David Stultz, Odessa, TX (US)

(*) Notice: Subject to any disclaimer, the term of this patent is extended or adjusted under 35 U.S.C. 154(b) by 196 days.

(21) Appl. No.: 17/731,235

(22) Filed: Apr. 27, 2022

(65) Prior Publication Data

US 2023/0160525 A1 May 25, 2023

Related U.S. Application Data

(60) Provisional application No. 63/283,098, filed on Nov. 24, 2021.

(51) Int. Cl.
| | | |
|---|---|---|
| *F16N 31/02* | (2006.01) | |
| *E21B 43/26* | (2006.01) | |
| *F16N 13/02* | (2006.01) | |

(52) U.S. Cl.
CPC .......... *F16N 31/02* (2013.01); *E21B 43/2607* (2020.05); *F16N 13/02* (2013.01)

(58) Field of Classification Search
CPC ........ B65B 67/1233; B65B 1/18; F16N 31/02
USPC .................................................. 141/313, 314
See application file for complete search history.

(56) References Cited

U.S. PATENT DOCUMENTS

| | | | | |
|---|---|---|---|---|
| 5,771,665 | A * | 6/1998 | Nelson .................... | B65B 43/56 53/570 |
| 5,951,079 | A * | 9/1999 | Winskye ............. | B65B 67/1238 294/58 |
| 7,815,800 | B2 * | 10/2010 | Komatsu ............ | B01D 17/0214 210/462 |
| 8,153,004 | B2 * | 4/2012 | Rodriguez-Jovet ......................... | B01D 17/0214 210/538 |
| 11,148,086 | B1 * | 10/2021 | Gentry ............... | B01D 39/1623 |
| 11,230,477 | B2 * | 1/2022 | Rockwell .................. | C02F 1/40 |
| 2014/0102581 | A1 * | 4/2014 | Adams .................... | E02B 3/108 141/10 |

FOREIGN PATENT DOCUMENTS

JP           2003080244 A  *  3/2003

\* cited by examiner

*Primary Examiner* — Timothy L Maust
(74) *Attorney, Agent, or Firm* — Loveless Law Group; Ryan Loveless

(57) ABSTRACT

A grease trap system to collect spent grease from a machine includes a collector having a bin and an outlet conduit. The bin defines a chamber to receive the spent grease from the machine and has a front end, a rear end, a front wall arranged at the front end of the bin, and a base extending obliquely and rearwardly from the front wall to the rear end. The outlet conduit extends outwardly from the front wall to facilitate a removal of the spent grease from the bin.

17 Claims, 4 Drawing Sheets

GREASE TRAP SYSTEM

CROSS-REFERENCE TO RELATED APPLICATIONS

This application claims priority to and the benefit of U.S. Provisional Patent Application No. 63/283,098, filed on Nov. 24, 2021, the contents of which are hereby incorporated by reference herein for all purposes.

TECHNICAL FIELD

This disclosure is generally directed to oil and gas field technologies. More specifically, this disclosure is directed to an improved grease trap system.

BACKGROUND

In the oil and gas industry, massive plunger pumps are often used to pump fracturing or "frac" fluid down a well. Multiple plunger pumps (e.g., four to six) can be loaded onto a single pumping unit (which can be upwards of 15 tons) to pump the frac fluid down the well. To allow such plunger pumps to operate effectively, the plunger pumps are lubed with an industrial, high heat resistant grease. As this grease is spent, viscosity is degraded and the spent frac grease is caught in grease traps under the plunger pumps.

These grease traps have caused a lot of problems. The conventional method of cleaning out such traps involves a multi-hour process that requires a dismounting of the plunger pumps, a removal of the trap, and shoveling out of the grease. The removal of the trap, itself often involves welding operation—for both removal and reinsertion of the trap. Because of the effort involved, many avoid cleaning out the traps—allowing them to overfill or remain at a state of near full. The traps (overfilled or closed to being full) spill out everywhere—on the ground, on the tires for the units, and on other equipment in the pumping units. These spills lead to fines by the department of transportation and conflicts between a frac fluid unit operator and a drilling operator amongst allegation of contaminating a site. They also are a safety hazard as the grease can get on breaks and inhibit ability of a frac truck to stop.

Also, in in addition to weakening the braking power, grease on the brakes has also started fires.

SUMMARY OF THE DISCLOSURE

According to an embodiment of the disclosure, a grease trap pumping application has been developed that does not utilize any moving parts between an input and output of the pump.

A grease trap system has been disclosed that facilitates a collection and removal of the spent grease from a machine. The grease trap system includes a collector having a bin and an outlet conduit. The bin defines a chamber to receive the spent grease from the machine and includes a front end, a rear end, and a front wall arranged at the front end of the bin. The bin also includes a base extending obliquely and rearwardly from the front wall to the rear end. The outlet conduit extends outwardly from the front wall to facilitate a removal of the spent grease from the bin.

A grease trap system has been disclosed that facilitates a collection and removal of the spent grease from a machine. The grease trap system includes a collector and a bag. The collector has a bin defining a chamber to receive the spent grease from the machine. The bin includes a front end, a rear end, and a front wall arranged at the front end of the bin. The bin also includes a base extending obliquely and rearwardly from the front wall to the rear end. The collector also includes an outlet conduit extending outwardly from the front wall to facilitate a removal of the spent grease from the bin. Moreover, the bag adapted to be removably engaged with the collector to receive and collect the spent grease from the collector through the outlet conduit.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
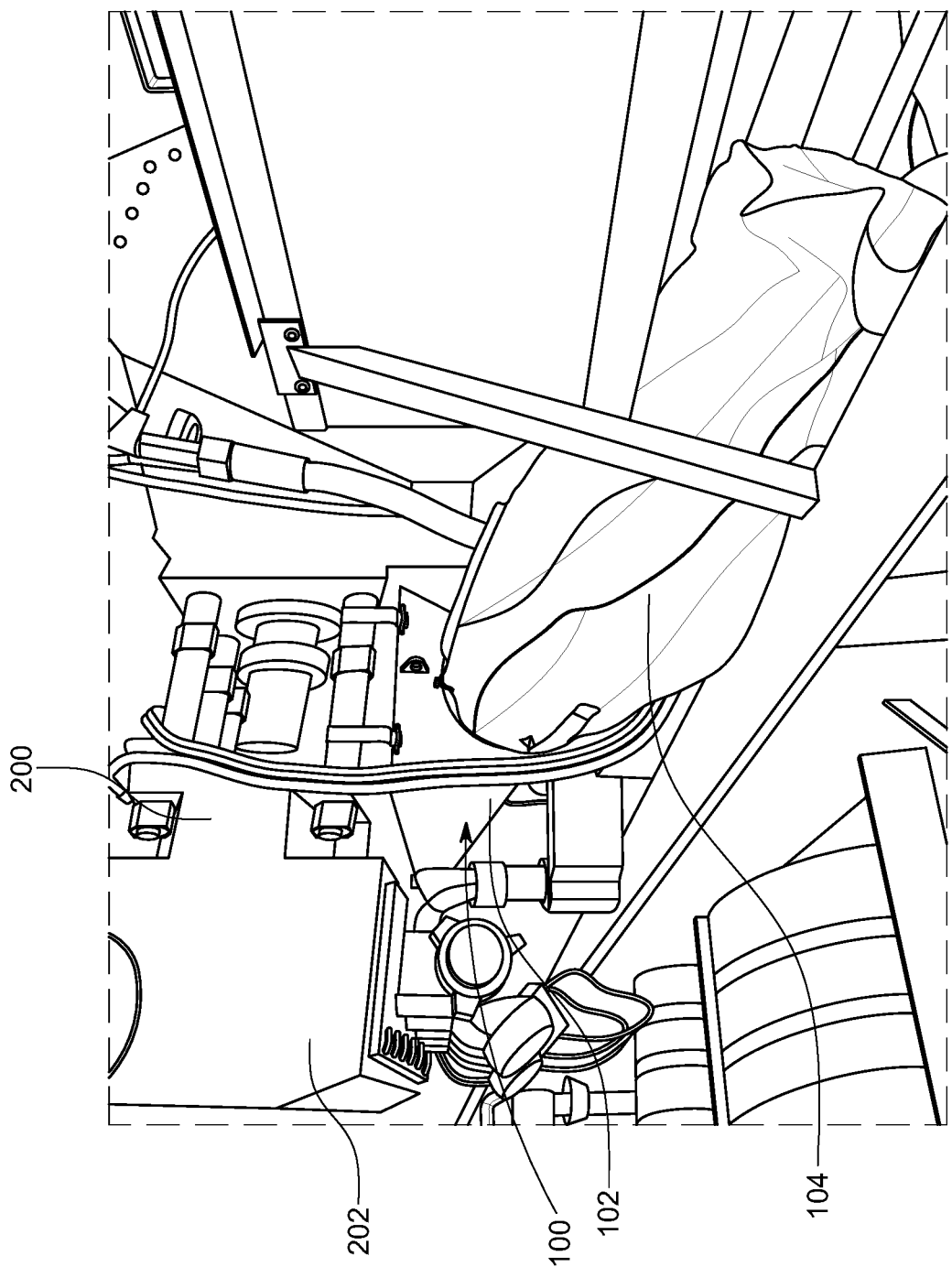
FIG. 1 show a grease trap system coupled to machine, according to an embodiment of the disclosure.

Example embodiments are described below with reference to the accompanying drawings. Unless otherwise expressly stated in the drawings, the sizes, positions, etc., of components, features, elements, etc., as well as any distances therebetween, are not necessarily to scale, and may be disproportionate and/or exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one element could be termed a "first element" and similarly, another element could be termed a "second element," or vice versa. The section headings used herein are for organizational purposes only and are not to be construed as limiting the subject matter described.

Unless indicated otherwise, the terms "about," "thereabout," "substantially," etc., mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "right," left," "below," "beneath," "lower," "above," and "upper," and the like, may be used herein for ease of description to describe one element's or feature's relationship to another element or feature, as illustrated in the drawings. It should be recognized that the spatially relative terms are intended to encompass different orientations in addition to the orientation depicted in the figures. For example, if an object in the figures is turned over, elements described as "below" or "beneath" other elements or features would then be oriented "above" the other elements or features. Thus, the term "below" can, for example, encompass both an orientation of above and below. An object may be otherwise oriented (e.g., rotated 90 degrees or at other orientations) and the spatially relative descriptors used herein may be interpreted accordingly.

Unless clearly indicated otherwise, all connections and all operative connections may be direct or indirect. Similarly, unless clearly indicated otherwise, all connections and all operative connections may be rigid or non-rigid.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

Many different forms and embodiments are possible without deviating from the spirit and teachings of this disclosure and so this disclosure should not be construed as limited to the example embodiments set forth herein. Rather, these example embodiments are provided so that this disclosure will be thorough and complete, and will convey the scope of the disclosure to those skilled in the art.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments.

Additionally, it should be understood that while certain advantages may be described with reference to certain embodiments, other embodiments may have some or none of such advantages.

The FIGURES described below, and the various embodiments used to describe the principles of the present disclosure in this patent document are by way of illustration only and should not be construed in any way to limit the scope of the disclosure. Those skilled in the art will understand that the principles of the present disclosure invention may be implemented in any type of suitably arranged device or system. Additionally, the drawings are not necessarily drawn to scale.

It will be understood that well known processes and components have not been described in detail and have been omitted for brevity. Although specific steps, structures and materials may have been described, the present disclosure may not be limited to these specifics, and others may be substituted as it is well understood by those skilled in the art, and various steps may not necessarily be performed in the sequences shown.

Additionally, although described in the context of oil and gas applications, other industrial processes can avail from the teachings of this disclosure.

In the oil and gas industry, massive plunger pumps are often used to pump fracturing or "frac" fluid down a well. Multiple plunger pumps (e.g., four to six) can be loaded onto a single pumping unit (which can be upwards of 15 tons) to pump the frac fluid down the well. To allow such plunger pumps to operate effectively, the plunger pumps are lubed with an industrial, high heat resistant grease. As this grease is spent, viscosity is degraded and the spent frac grease is caught in grease traps under the plunger pumps.

These grease traps have caused a lot of problems. The conventional method of cleaning out such traps involves a multi-hour process that requires a dismounting of the plunger pumps, a removal of the trap, and shoveling out of the grease. The removal of the trap, itself often involves welding operation—for both removal and reinsertion of the trap. Because of the effort involved, many avoid cleaning out the traps—allowing them to overfill or remain at a state of near full. The traps (overfilled or closed to being full) spill out everywhere—on the ground, on the tires for the units, and on other equipment in the pumping units. These spills lead to fines by the department of transportation and conflicts between a frac fluid unit operator and a drilling operator amongst allegations of contaminating a site. They also are a safety hazard as the grease can get on breaks and inhibit ability of a frac truck to stop.

Given these concerns, certain embodiments of the disclosure provide an improved grease trap Referring to FIG. 1, a grease trap system 100 coupled to a machine, for example, a pumping unit 200 is shown. The pumping unit 200 includes at least one pump 202 used in oil and gas application, and may be used to pump fracturing fluid down a well. As shown, the grease trap system 100 includes a collector 102 and a bag 104 removably engaged to the collector 102 to receive the spent grease from the collector 102. The collector 102 is positioned at a location where the grease is provided for lubricating moving and non-moving components of the pumping unit 200 such that the spent grease falls inside the collector 102 from the pumping unit 200 due to gravity. Accordingly, the collector 102 is arranged underneath such components of the pumping unit 200, and may be welded/engaged to the pumping unit 200. The spent grease moves to the bag 104 from the collector 102 under gravity, and the bag 104 is removed from the collector 102 after being full of the spent grease. Accordingly, the grease trap system 100 provides an improved collection and disposal of the spent grease, and enhances the cleaning of the area, and reduces hazards due to the spilling of the spent grease.

Figure 2:
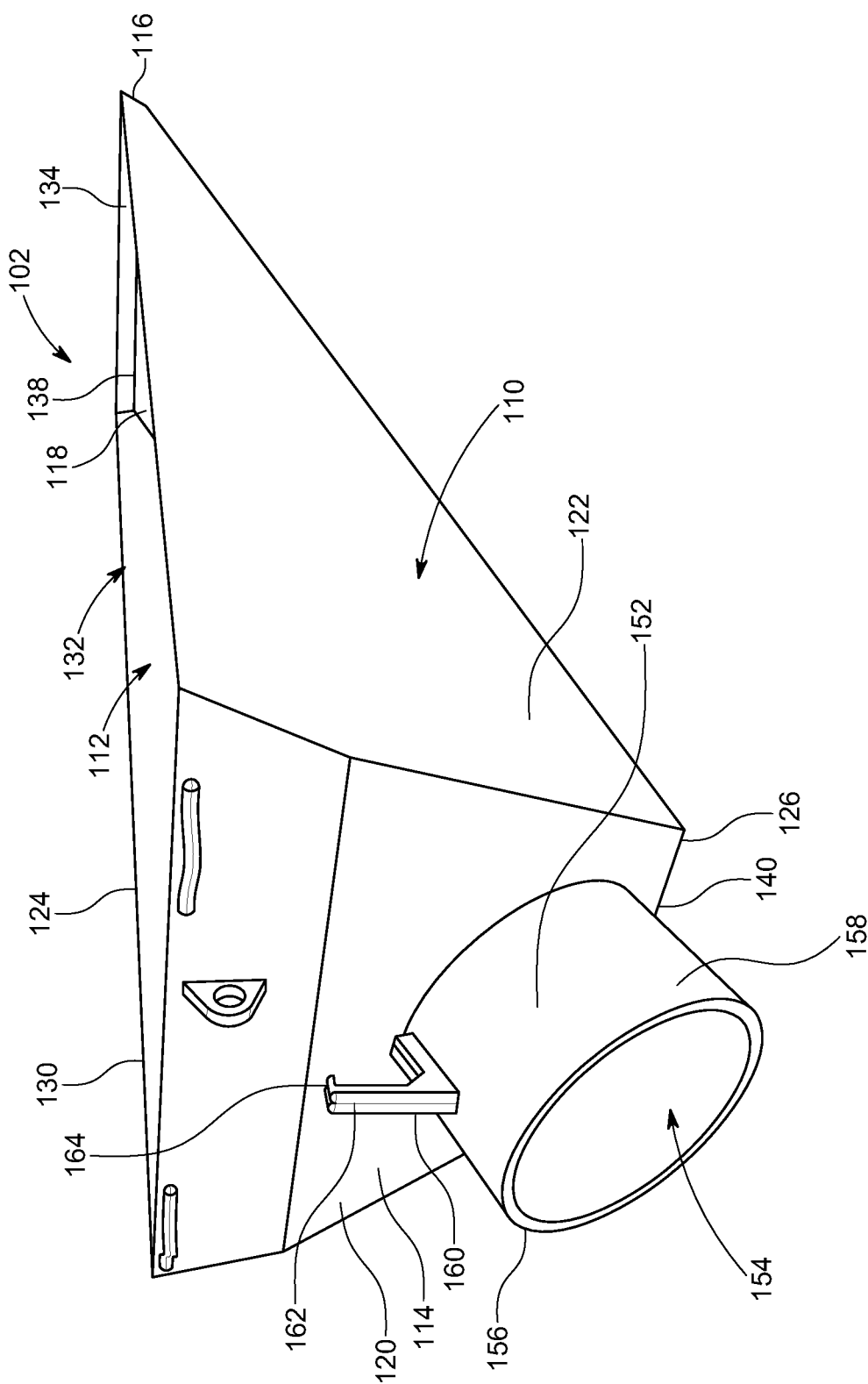
FIG. 2 show a side perspective view of a collector of the grease trap system, according to an embodiment of the disclosure.
Figure 3:
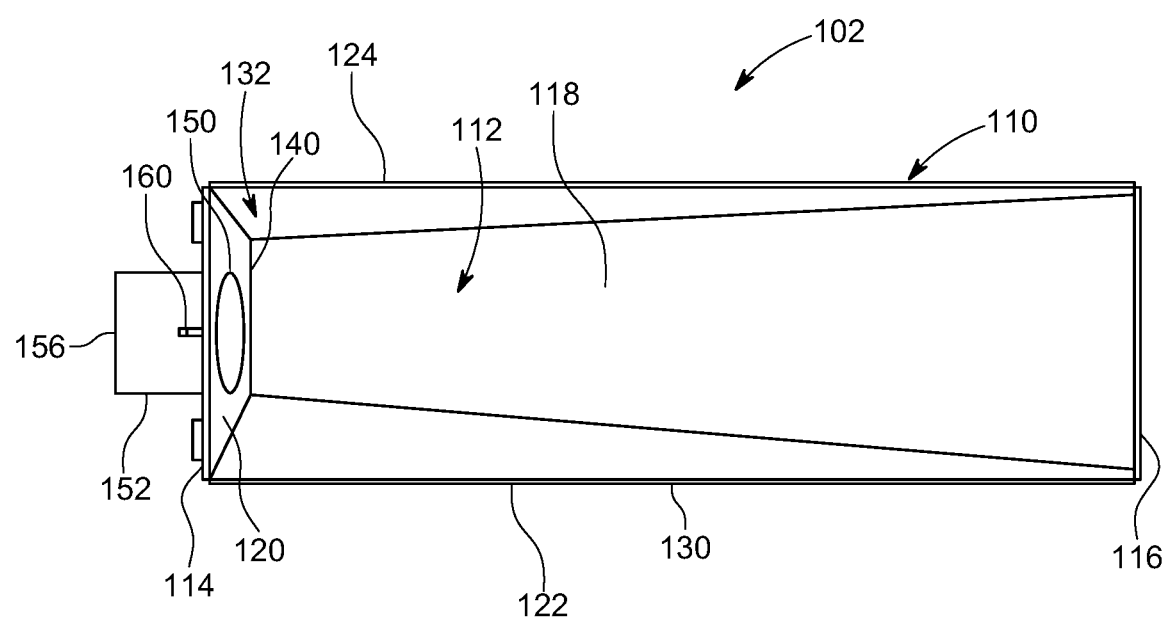
FIG. 3 shows a top perspective view of the collector of FIG. 2, according to an embodiment of the disclosure.

Referring to FIGS. 2 and 3, the collector 102 includes a bin 110 defining a chamber 112 to receive and collect the spent grease, and having a first end 114 (i.e., front end 114), a second end 116 (i.e., rear end 116), a base 118 extending from the front end 114 to the rear end 116, a first wall 120 (i.e., front wall 120) arranged at the front end 114 and extending vertically upwardly from the base 118, and a pair of sidewalls, for example, a first sidewall 122 and a second sidewall 124, arranged spaced apart and substantially parallel to each other. Each of the sidewalls 122, 124 extends vertically upwardly from the base 118, and also extends from the front wall 120 to the rear end 116 of the bin 110. As shown, the base 118 extends obliquely and rearwardly from a lower edge 126 of the front wall 120 to the rear end 116. Accordingly, heights of the sidewalls 122, 124 decrease in a direction from the front end 114 to the rear end 116. Moreover, an upper edge 130 of the bin 110 defines an opening 132 of the chamber 112 to allow a falling of the spent grease inside the chamber 112 from the pumping unit 200. In an embodiment, the bin 110 includes a rear wall 134 arranged at the rear end 116 of the bin 110 and extending upwardly and vertically from a rear edge 138 of the base 118. In such a case, the rear edge 138 of the base 118 is arranged proximate to the upper edge 130 of the bin 110 relative to a front edge 140 of the base 118. Accordingly, an acute angle is defined between the base 118 and the front wall 120, while an obtuse angle is defined between base 118 and the rear wall 134. In some embodiments, the rear wall 134 may be omitted. In such cases, the rear edge 138 of the base 118 coincides with the upper edge 130 of the bin 110. In an assembly of the collector 102 with the pumping unit 200, the collector 102 is engaged with the pumping unit 200 such that the base 118 is arranged at an inclination relative to a horizontal surface such that the front edge 140 of the base 118 is positioned relatively downwardly to the rear edge 138 of the base 118. Additionally, the front wall 120 defines an outlet opening 150 (shown in FIG. 3) to enable an exit of the spent grease from the chamber 112.

Moreover, the collector 102 includes an outlet conduit 152 extending outwardly from the front wall 120 and is arranged in communication with the outlet opening 150 to facilitate a flow of the spent grease out of the chamber 112. As shown in FIG. 2, the outlet conduit 152 extends obliquely and downwardly from the front wall 120 and defines an outlet port 154 at its free end 156. The inclination of the outlet conduit 152 relative to the front wall 120 enable a flow of the spent grease from the outlet opening 150 to the outlet port 154 under gravity. Also, in an embodiment, a lowermost portion of the conduit 152 is arranged proximate to the base 118 of the bin 110.

Further, the collector 102 includes at least one hook structure 160 coupled to the outlet conduit 152 to enable an engagement and retention of the bag 104 with the outlet conduit 152 (i.e., the collector 102). Although a single hook structure 160 is shown, it may be appreciated that the collector 102 may include two hook structures 160 that are arranged/disposed diametrically opposite to each other and connected to the outlet conduit 152. In an embodiment, the hook structure 160 may be arranged proximate to the front wall 120 relative to the free end 156 of the conduit 152 and may extend radially outwardly of an outer surface 158 of the conduit 152. In an embodiment, as shown in FIG. 2, one hook structure 160 may be arranged opposite to the lower most portion of the conduit 152 and may extend upwardly towards the upper edge 130 of the bin 110. As shown, the hook structure 160 may include a first portion 162 extending outwardly and away from the outer surface 158 of the conduit 152, and a second portion 164 extending from the first portion 162 and away from the first portion 162. The second portion 164 is bent relative to the first portion 162 and acts as a stopper to prevent the disengagement of the bag 104 from the collector 102.

Figure 4:
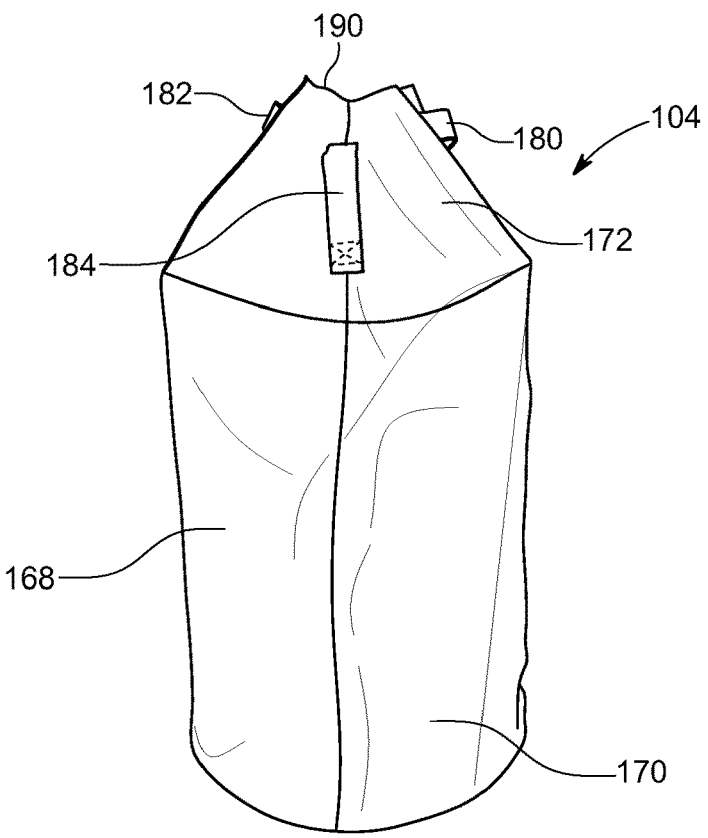
FIG. 4 shows a side perspective view of a bag of the grease trap system, according to an embodiment of the disclosure.
Figure 5:
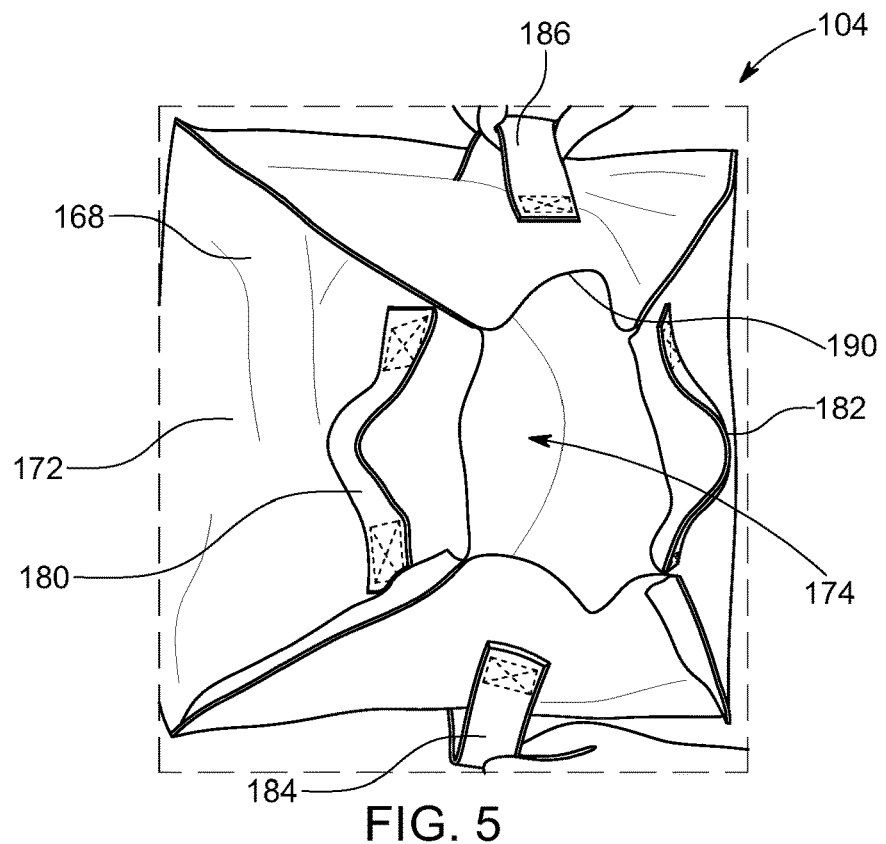
FIG. 5 shows a top portion of the bag of FIG. 4, according to an embodiment of the disclosure.

Referring to FIGS. 4 and 5, the bag 104 according to an example embodiment is shown. The bag 104 may include a body 168 having a bottom portion 170 and a top portion 172 defining an inlet opening 174 (shown in FIG. 5) of the bag 104. In the illustrated embodiment, the top portion 172 of the bag 104 includes the shape of a frustrum of a cone; however, other shapes may be used. The bag 104 includes at least one first strap, for example, two first straps 180, 182, that can engage with the hook structure 160 of the collector 102 to engage and retain the bag 104 with the collector 102 (i.e., the conduit 152). The first straps 180, 182 are arranged opposite to each other and or either side of the inlet opening 174 of the bag 104. By arranging/positioning the first straps 180, 182 on either side of the bag 104, either side of the bag 104 can be engaged with the hook structure 160 and can be placed on top of the conduit 152. As shown, each of the first straps 180, 182 extends in a horizontal direction (i.e., first direction). The bag 104 also includes at least one second strap, for example, a pair of second straps 184, 186 that extend in vertical direction (i.e., second direction) and acts as handles of the bag 104 to position the bag 104 during insertion and removal on to the conduit 152. The two second straps 184, 184 are arranged opposite to each other. For engaging the bag 104 with the collector 102, a portion of the outlet conduit 152 is inserted inside the bag through the inlet opening 174 and the at least one of the first straps 180, 182 is engaged with the at least one hook structure 160. The first straps 180, 182 and the second straps 184, 186 are engaged to the top portion 172 of the body 168, and the ends of each of the second straps 184, 186 and each of the first straps 180, 182 may be stitched to the body 168. Also, the first straps 180, 182 may be arranged/disposed proximal to an upper edge 190 of the body 168 relative to the second straps 184, 186. The upper edge 190 defines the inlet opening 172 of the bag 104.

The bag 104 may be made of a variety of materials such as high-density polyethylene (HDPE), polyesters coated with polyurethane, polyethylene, vinyl, and other plastic-based materials. Other types of materials may be used. Plastics are resistant to negative reactions with metal (e.g., rust) while still being sturdy enough to handle, for example, the spent grease. Additionally, plastics can be recycled and re-used or repurposed. As such, the bag is environmentally friendly.

In particular configurations, the bag 104 has a flexible shape. When not in use, in some configurations, the bag 104 may be folded.

While this disclosure has described certain embodiments and generally associated methods, alterations, and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims. As a non-limiting example, while a particular application has been described, the described process may be used with other oilfield applications and industrial applications.

What is claimed is:

1. A grease trap system to collect spent grease from a machine, the grease trap system comprising:
   a collector including
      a bin defining a chamber to receive the spent grease from the machine and having an opening to receive the spent grease falling from the machine, a front end, a rear end, a front wall arranged at the front end of the bin, a base opposite the opening and extending obliquely and rearwardly from the front wall to the rear end, and
      an outlet conduit extending outwardly from the front wall to facilitate a removal of the spent grease from the bin; wherein the spent grease is from a pumping unit used in oil and gas applications.

2. The grease trap system of claim 1 further including an impermeable bag adapted to be removably engaged with the collector to receive and collect the spent grease from the collector through the outlet conduit.

3. The grease trap system of claim 2, wherein the collector includes at least at least one hook structure engaged to the outlet conduit, the at least one hook structure facilitating the bag's removable engagement with the collector such that the bag can be removed without moving the collector.

4. The grease trap system of claim 3, wherein the bag includes at least one first strap adapted to engage with the at least one hook structure to enable the removable engagement of the bag with the outlet conduit.

5. The grease trap system of claim 4, wherein the at least one hook structure includes a first portion engaged to the outlet conduit and a second portion extending from the first portion and is bent relative to the first portion to prevent a disengagement of the at least one first strap and the at least one hook structure.

6. The grease trap system of claim 2, wherein the bag includes at least one second strap to enable a holding of the bag.

7. The grease trap system of claim 1, wherein the front wall defines an outlet opening to enable a flow of the spent grease from the bin to the outlet conduit.

8. The grease trap system of claim 1, wherein the outlet conduit extends obliquely and downwardly from the front wall.

9. The grease trap system of claim 1, wherein the bin includes a pair of sidewalls arranged spaced apart from each other and extending from the front wall to the rear end, wherein heights of the sidewalls decrease in a direction from the front wall towards the rear end.

10. A grease trap system to collect spent grease from a machine, the grease trap system comprising:
a collector including
a bin defining a chamber to receive the spent grease from the machine and having a front end, a rear end, a front wall arranged at the front end of the bin, and a base extending obliquely and rearwardly from the front wall to the rear end, and
an outlet conduit extending outwardly from the front wall to facilitate a removal of the spent grease from the bin; and
an impermeable bag adapted to be removably engaged with the collector to receive and collect the spent grease from the collector through the outlet conduit;
wherein the spent grease is from a pumping unit used in oil and gas applications.

11. The grease trap system of claim 10, wherein the collector includes at least one hook structure engaged to the outlet conduit, the at least one hook structure facilitating the removable engagement of the bag with the collector such that the bag can be removed without moving the collector.

12. The grease trap system of claim 11, wherein the bag includes at least one first strap adapted to engage with the at least one hook structure to enable the removable engagement of the bag with the outlet conduit.

13. The grease trap system of claim 12, wherein the at least one hook structure includes a first portion engaged to the outlet conduit and a second portion extending from the first portion and is bent relative to the first portion to prevent a disengagement of the at least one first strap and the at least one hook structure.

14. The grease trap system of claim 10, wherein the bag includes at least one second strap to enable a holding of the bag.

15. The grease trap system of claim 10, wherein the front wall defines an outlet opening to enable a flow of the spent grease from the bin to the outlet conduit.

16. The grease trap system of claim 10, wherein the outlet conduit extends obliquely and downwardly from the front wall.

17. The grease trap system of claim 10, wherein the bin includes a pair of sidewalls arranged spaced apart from each other and extending from the front wall to the rear end, wherein heights of the sidewalls decrease in a direction from the front wall towards the rear end.

\* \* \* \* \*